(12) United States Patent
Kondo et al.

(10) Patent No.: US 11,148,562 B2
(45) Date of Patent: Oct. 19, 2021

(54) VEHICLE SEAT STRUCTURE (71) Applicants: TOYOTA JIDOSHA KABUSHIKI KAISHA, Aichi-ken (JP); TOYOTA BOSHOKU KABUSHIKI KAISHA, Aichi (JP)

(72) Inventors: Keiichi Kondo, Chiryu (JP); Katsunori Yamada, Toyota (JP); Hiroyuki Suzuki, Toyohashi (JP)

(73) Assignees: TOYOTA JIDOSHA KABUSHIKI KAISHA, Aichi-ken (JP); TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/755,597

(22) PCT Filed: May 14, 2019

(86) PCT No.: PCT/JP2019/019145
§ 371 (c)(1),
(2) Date: Apr. 13, 2020

(87) PCT Pub. No.: WO2020/066112
PCT Pub. Date: Apr. 2, 2020

(65) Prior Publication Data
US 2021/0197696 A1 Jul. 1, 2021

(30) Foreign Application Priority Data
Sep. 27, 2018 (JP) .............................. JP2018-181196

(51) Int. Cl.
*B60N 2/427* (2006.01)
*B60N 2/08* (2006.01)
(Continued)

(52) U.S. Cl.
CPC ......... *B60N 2/42727* (2013.01); *B60N 2/067* (2013.01); *B60N 2/0722* (2013.01); *B60N 2/08* (2013.01)

(58) Field of Classification Search
CPC ........ B60N 2/067; B60N 2/0722; B60N 2/08; B60N 2/42727
See application file for complete search history.

(56) References Cited

U.S. PATENT DOCUMENTS 5,556,165 A * 9/1996 Pickles .................. B60N 2/233
297/362.14
5,582,461 A * 12/1996 Pickles .................. B60N 2/233
297/362.14
(Continued)

FOREIGN PATENT DOCUMENTS

JP    2003-252087 A    9/2003
JP    2005-297931 A    10/2005
(Continued)

*Primary Examiner* — James M Ference
(74) *Attorney, Agent, or Firm* — Hauptman Ham, LLP (57) ABSTRACT

A vehicle seat structure includes a vehicle seat including a seat cushion configured to support an occupant, an upper rail that is fixed to the vehicle seat and that moves in a seat front-rear direction together with the vehicle seat, and a lower rail that is fixed to a floor of a vehicle body and that engages with the upper rail and supports the upper rail so as to allow movement of the upper rail. The vehicle seat structure includes a lock mechanism configured to restrict movement of the upper rail with respect to the lower rail. The lock mechanism is configured such that at least part of the lock mechanism deforms when a force toward the seat front side arising due to inertia acts on the vehicle seat in a state in which the upper rail is engaged with a seat rear side portion of the lower rail.

4 Claims, 6 Drawing Sheets (51) Int. Cl.
*B60N 2/06* (2006.01)
*B60N 2/07* (2006.01)

(56) References Cited

U.S. PATENT DOCUMENTS

| | | | | |
|---|---|---|---|---|
| 6,220,642 B1* | 4/2001 | Ito | B60N 2/0232 | 248/429 |
| 6,244,660 B1* | 6/2001 | Yoshimatsu | B60N 2/0232 | 248/429 |
| 6,869,057 B2* | 3/2005 | Matsumoto | B60N 2/0705 | 248/429 |
| 6,923,415 B2* | 8/2005 | Yokoi | B60N 2/0705 | 248/424 |
| 7,303,223 B2* | 12/2007 | Nakamura | B60N 2/0232 | 248/429 |
| 7,314,204 B2* | 1/2008 | Kohmura | B60N 2/0705 | 248/430 |
| 7,328,877 B2* | 2/2008 | Yamada | B60N 2/0705 | 248/430 |
| 7,422,186 B2* | 9/2008 | Kropfreiter | B60N 2/067 | 248/424 |
| 7,506,856 B2* | 3/2009 | Ikegaya | B60N 2/0705 | 248/419 |
| 7,614,597 B2* | 11/2009 | Matsumoto | B60N 2/0705 | 248/429 |
| 7,665,703 B2* | 2/2010 | Tanaka | B60N 2/0727 | 248/429 |
| 7,722,006 B2* | 5/2010 | Beneker | B60N 2/0893 | 248/424 |
| 7,735,798 B2* | 6/2010 | Kojima | B60N 2/0843 | 248/429 |
| 8,038,115 B2* | 10/2011 | Boes | B60N 2/0707 | 248/430 |
| 8,517,328 B2* | 8/2013 | Wieclawski | B60N 2/123 | 248/429 |
| 8,616,515 B2* | 12/2013 | Hayashi | B60N 2/0887 | 248/429 |
| 8,714,509 B2* | 5/2014 | Hayashi | B60N 2/0887 | 248/429 |
| 8,820,694 B2* | 9/2014 | Tarusawa | B60N 2/067 | 248/430 |
| 9,056,561 B2* | 6/2015 | Hayashi | B60N 2/0887 | |
| 9,126,505 B2* | 9/2015 | Moriyama | B60N 2/0705 | |
| 9,150,124 B2* | 10/2015 | Becker | B60N 2/0881 | |
| 9,827,878 B1* | 11/2017 | Matsufuji | B60N 2/07 | |
| 10,640,015 B2* | 5/2020 | Taniguchi | B60N 2/0705 | |
| 2002/0190182 A1* | 12/2002 | Flick | B60N 2/0705 | 248/430 |
| 2003/0168566 A1* | 9/2003 | Ito | B60N 2/0232 | 248/429 |
| 2003/0230696 A1* | 12/2003 | Yamada | B60N 2/0818 | 248/424 |
| 2004/0188586 A1* | 9/2004 | Jaudouin | B60N 2/08 | 248/429 |
| 2004/0232750 A1* | 11/2004 | Rohee | B60N 2/085 | 297/334 |
| 2007/0090230 A1* | 4/2007 | Yamada | B60N 2/0843 | 246/1 R |
| 2007/0090263 A1* | 4/2007 | Yamada | B60N 2/0825 | 248/429 |
| 2007/0114355 A1* | 5/2007 | Koumura | B60N 2/0818 | 248/429 |
| 2007/0120407 A1* | 5/2007 | Kojima | B60N 2/0825 | 297/344.11 |
| 2008/0048087 A1* | 2/2008 | Kojima | B60N 2/0825 | 248/430 |
| 2009/0289485 A1* | 11/2009 | Walter | B60N 2/0893 | 297/344.1 |
| 2011/0233367 A1* | 9/2011 | Mizuno | B60N 2/0818 | 248/429 |
| 2011/0233368 A1* | 9/2011 | Nihonmatsu | B60N 2/0705 | 248/429 |
| 2012/0032058 A1* | 2/2012 | Nihonmatsu | B60N 2/06 | 248/429 |
| 2012/0132777 A1* | 5/2012 | Nakamura | B60N 2/085 | 248/429 |
| 2012/0132778 A1* | 5/2012 | Nakamura | B60N 2/085 | 248/429 |
| 2013/0168524 A1* | 7/2013 | Aoi | B60N 2/0881 | 248/430 |
| 2013/0264454 A1* | 10/2013 | Hayashi | B60N 2/08 | 248/429 |
| 2014/0110553 A1* | 4/2014 | Hoshihara | B60N 2/06 | 248/429 |
| 2014/0224954 A1* | 8/2014 | Oh | B60N 2/0705 | 248/429 |
| 2014/0231610 A1* | 8/2014 | Hoshihara | B60N 2/0818 | 248/430 |
| 2014/0232157 A1* | 8/2014 | Hoshihara | B60N 2/085 | 297/344.1 |
| 2014/0239141 A1* | 8/2014 | Yamada | B60N 2/085 | 248/430 |
| 2014/0239690 A1* | 8/2014 | Yamada | B60N 2/123 | 297/344.1 |
| 2014/0353454 A1* | 12/2014 | Yamada | B60N 2/0818 | 248/430 |
| 2015/0069202 A1* | 3/2015 | Hayashi | B60N 2/06 | 248/429 |
| 2015/0090853 A1* | 4/2015 | Arakawa | B60N 2/0725 | 248/429 |
| 2015/0090854 A1* | 4/2015 | Hayashi | B60N 2/0715 | 248/429 |
| 2015/0217661 A1* | 8/2015 | Takiya | B60N 2/0818 | 248/429 |
| 2015/0306980 A1* | 10/2015 | Furuta | B60N 2/07 | 248/429 |
| 2015/0306981 A1* | 10/2015 | Arakawa | B60N 2/0818 | 248/429 |
| 2016/0114703 A1* | 4/2016 | Fujita | B60N 2/0825 | 297/344.1 |
| 2016/0221477 A1* | 8/2016 | Satoh | B60N 2/0837 | |
| 2017/0341534 A1* | 11/2017 | Taniguchi | B60N 2/0705 | |
| 2017/0341535 A1* | 11/2017 | Taniguchi | B60N 2/0875 | |
| 2018/0009337 A1* | 1/2018 | Kimura | B60N 2/0875 | |
| 2018/0022236 A1* | 1/2018 | Taniguchi | B60N 2/0722 | 297/344.11 |
| 2018/0222352 A1* | 8/2018 | Flick | B60N 2/0875 | |
| 2018/0257514 A1* | 9/2018 | Taniguchi | B60N 2/085 | |
| 2018/0257515 A1* | 9/2018 | Taniguchi | B60N 2/0705 | |
| 2018/0334054 A1* | 11/2018 | Higuchi | B60N 2/067 | |
| 2019/0168636 A1* | 6/2019 | Higuchi | B60N 2/075 | |
| 2019/0270393 A1* | 9/2019 | Taniguchi | B60N 2/0881 | |
| 2019/0283630 A1* | 9/2019 | Tamaki | B60N 2/0875 | |

FOREIGN PATENT DOCUMENTS

| | | |
|---|---|---|
| JP | 2007-38810 A | 2/2007 |
| JP | 2015-80979 A | 4/2015 |

* cited by examiner

VEHICLE SEAT STRUCTURE

RELATED APPLICATIONS

The present application is a National Phase of International Application Number PCT/JP2019/019145, filed May 14, 2019, which claims priority to Japanese Application Number 2018-181196, filed Sep. 27, 2018.

TECHNICAL FIELD

The present disclosure relates to a vehicle seat structure.

BACKGROUND ART

For example, Japanese Patent Application Laid-Open (JP-A) No. 2015-80979 discloses a vehicle seat structure that prevents movement of a vehicle seat toward a seat front side as a result of a force due to inertia in a vehicle head-on collision. The vehicle seat structure disclosed in this document includes a seat rail that is fixed to a floor panel through a bracket and that supports the vehicle seat so as to allow sliding of the vehicle seat in a seat front-rear direction, a lock mechanism that locks sliding of the vehicle seat in the seat front-rear direction, and a reinforcing member that is fixed to the bracket. In a vehicle head-on collision, deformation of a front section of the seat rail is suppressed by the reinforcing member, such that the lock mechanism does not release the lock on sliding of the vehicle seat. Movement of the vehicle seat toward the seat front side as a result of a force due to inertia in a vehicle head-on collision is thereby suppressed.

SUMMARY OF INVENTION

Technical Problem

However, in a state in which the vehicle seat has been slid toward the seat rear side, for example in order for an occupant seated in the vehicle seat to assume a relaxed posture, the size of a space around the legs of the occupant seated in the vehicle seat increases. This could conceivably present difficulties in suppressing a phenomenon (referred to as a submarining phenomenon) in which the occupant seated in the vehicle seat slips toward the seat front side along a seat cushion in a vehicle collision such as a head-on collision.

In consideration of the above circumstances, the present disclosure obtains a vehicle seat structure capable of suppressing an occupant seated in a vehicle seat from slipping toward a seat front side along a seat cushion in a vehicle collision.

Solution to Problem

A vehicle seat structure of a first aspect includes a vehicle seat including a seat cushion configured to support the buttocks and thighs of an occupant, a movable member that is fixed to the vehicle seat and that moves in a seat front-rear direction together with the vehicle seat, a fixed member that is fixed to a floor of a vehicle body and that engages with the movable member and supports the movable member so as to allow movement of the movable member in the seat front-rear direction, and a lock mechanism configured to restrict movement of the movable member with respect to the fixed member, and also configured so as to permit movement of the movable member toward a seat front side with respect to the fixed member by at least part of the lock mechanism deforming when a force toward the seat front side arising due to inertia acts on the vehicle seat in conjunction with a collision in a state in which the movable member is engaged with a seat rear side portion of the fixed member.

According to the vehicle seat structure of the first aspect, a seat front-rear direction position of the vehicle seat is changed by moving the movable member engaged with the fixed member in the seat front-rear direction with respect to the fixed member. Movement of the movable member with respect to the fixed member is restricted by the lock mechanism so as to fix the seat front-rear direction position of the vehicle seat. Note that in a state in which the movable member is engaged with the seat rear side portion of the fixed member, namely in a state in which the seat front-rear direction position of the vehicle seat is disposed toward the rear side, at least part of the lock mechanism deforms when the force toward the seat front side arising due to inertia acts on the vehicle seat in conjunction with a collision. Movement of the movable member toward the seat front side with respect to the fixed member is thus permitted, and the vehicle seat accordingly moves toward the seat front side. This reduces the size of a space in which the legs of the occupant are able to move toward the seat front side. This enables the occupant seated in the vehicle seat to be suppressed from slipping toward the seat front side along the seat cushion in a vehicle collision.

A vehicle seat structure of a second aspect is the vehicle seat structure of the first aspect, wherein the lock mechanism includes plural engagement portions provided at the fixed member so as to be disposed at intervals along the seat front-rear direction, and including an engaging portion provided at the movable member and configured to engage with the respective engagement portions. Moreover, movement of the movable member in the seat front-rear direction with respect to the fixed member is permitted in a state in which the engaging portion is not engaged with the engagement portions, movement of the movable member in the seat front-rear direction with respect to the fixed member is restricted in a state in which the engaging portion is engaged with the engagement portions, and a strength of peripheral edge portions of plurality of the engagement portions disposed toward the seat rear side is lower than a strength of peripheral edge portions of plurality of the engagement portions disposed further toward the seat front side than the plural seat rear side engagement portions.

According to the vehicle seat structure of the second aspect, movement of the movable member in the seat front-rear direction with respect to the fixed member is permitted in a state in which the engaging portion is not engaged with the engagement portions. Moreover, when the engaging portion engages with any of the engagement portions, movement of the movable member in the seat front-rear direction with respect to the fixed member is restricted, thereby fixing the position of the vehicle seat in the seat front-rear direction at a position corresponding to the engagement portion with which the engaging portion is engaged. Note that out of the plural engagement portions, the strength of the peripheral edge portions of the plural engagement portions disposed toward the seat rear side is lower than the strength of the peripheral edge portions of the plural engagement portions disposed further toward the seat front side than the plural seat rear side engagement portions. Thus, when the force toward the seat front side arising due to inertia acts on the vehicle seat in conjunction with a collision in a state in which the engaging portion is engaged with any of the plural engagement portions disposed toward the seat rear side, the engaging portion presses the peripheral edge portion of the engagement portion, causing the peripheral edge portion of the engagement portion to deform. Movement of the movable member toward the seat front side with respect to the fixed member is thereby permitted, and the vehicle seat moves toward the seat front side. This reduces the size of a space in which the legs of the occupant are able to move toward the seat front side. This enables the occupant seated in the vehicle seat to be suppressed from slipping toward the seat front side along the seat cushion in a vehicle collision.

A vehicle seat structure of a third aspect is the vehicle seat structure of the second aspect, wherein the fixed member is configured by a lower rail that is formed in an elongated shape with a length direction along a vehicle front-rear direction and that has a cross-section profile open toward a vehicle upper side as viewed from a vehicle front side. The lower rail includes a bottom wall extending along front-rear and left-right directions, a right upright wall and a left upright wall that are respectively bent so as to extend upward from left and right direction end portions of the bottom wall, a right upper wall and a left upper wall that are respectively bent so as to extend to left or right from upper end portions of the right upright wall and the left upright wall, and a right inner wall and a left inner wall that are respectively bent so as to extend downward from a left side end portion of the right upper wall and a right side end portion of the left upper wall. The fixed member is formed with plural downward-opening recesses in the right inner wall and the left inner wall, with front edges of each of the plural recesses sloping forward on progression downward and rear edges of each of the plural recesses sloping rearward on progression downward such that a shape formed by linking together the front edge, the rear edge, a bottom, and an open end of each of the recesses is an isosceles trapezoid shape. Of the plural recesses, a forward-opening notch is formed at a boundary between the rear edge and the bottom of each recess configuring plural of the recesses at a seat rear side portion. The movable member is configured by an upper rail provided with the engaging portion and disposed in an inner portion of the lower rail, and the strength of peripheral edge portions of the plural recesses disposed at the seat rear side is lower than the strength of peripheral edge portions of plural of the recesses disposed further toward the seat front side than the plural seat rear side recesses due to the engaging portion engaging with one of the recesses and a peripheral edge portion of the recess being deformable about a bottom of the notch when the engaging portion engaged with the recess presses the peripheral edge portion of the recess forward.

A vehicle seat structure of a fourth aspect is the vehicle seat structure of the first aspect, wherein the lock mechanism includes a first threaded member that includes a first screw thread and is moved in the seat front-rear direction together with the movable member, and a second threaded member including a second screw thread interlocking with the first screw thread. The first threaded member is moved in the seat front-rear direction along the second threaded member and the movable member is moved in the seat front-rear direction with respect to the fixed member by rotation of the first threaded member. Movement of the first threaded member with respect to the second threaded member is restricted and movement of the movable member in the seat front-rear direction with respect to the fixed member is restricted in a state in which rotation of the first threaded member has stopped. Moreover, a height of the second screw thread at a seat rear side portion is lower than a height of the second screw thread further toward the seat front side than the seat rear side portion of the second screw thread.

According to the vehicle seat structure of the fourth aspect, the first threaded member is moved in the seat front-rear direction along the second threaded member by rotation of the first threaded member. The movable member is accordingly moved in the seat front-rear direction with respect to the fixed member so as to change the seat front-rear direction position of the vehicle seat. In a state in which rotation of the first threaded member has stopped, movement of the first threaded member with respect to the second threaded member is restricted, such that movement of the movable member in the seat front-rear direction with respect to the fixed member is restricted. The seat front-rear direction position of the vehicle seat is thus fixed. Note that the height of the second screw thread at the seat rear side portion of the second threaded portion is lower than the height of the second screw thread further toward the seat front side than the seat rear side portion of the second screw thread. Thus, when the force toward the seat front side arising due to inertia acts on the vehicle seat in conjunction with a collision in a state in which the first screw thread of the first threaded portion and the second screw thread of the second threaded portion are interlocked with each other at the seat rear side portion, the first screw thread of the first threaded portion causes the second screw thread of the second threaded portion at the seat rear side portion to deform. Movement of the movable member toward the seat front side with respect to the fixed member is thus permitted, and the vehicle seat moves toward the seat front side. This reduces the size of a space in which the legs of the occupant are able to move toward the seat front side. This enables the occupant seated in the vehicle seat to be suppressed from slipping toward the seat front side along the seat cushion in a vehicle collision.

A vehicle seat structure of a fifth aspect is the vehicle seat structure of the fourth aspect, wherein the lock mechanism is configured by a power seat mechanism having a motor as a drive source. The power seat mechanism includes a worm gear configured to be rotated by the motor, a drive nut serving as the first threaded member and rotated by the worm gear, and including an inner peripheral portion formed with an inner tooth serving as the first screw thread, and a screw shaft serving as the second threaded member and including an outer peripheral portion formed with an outer tooth serving as the second screw thread that interlocks with the inner tooth. A height of the outer tooth at a seat rear side portion is lower than a height of the outer tooth further toward the seat front side than the seat rear side portion so as to enable deformation of the outer tooth at the seat rear side portion by the drive nut and thereby permit movement of the movable member toward the seat front side with respect to the fixed member when the force toward the seat front side arising due to inertia acts on the vehicle seat in conjunction with a collision in a state in which the inner tooth and the outer tooth are interlocked with each other.

Advantageous Effects of Invention

The vehicle seat structure according to the present disclosure exhibits the excellent advantageous effect of enabling the occupant seated in the vehicle seat to be suppressed from slipping toward the seat front side along the seat cushion in a vehicle collision.

DESCRIPTION OF EMBODIMENTS

Explanation follows regarding a vehicle seat structure according to an exemplary embodiment of the present disclosure, with reference to FIG. 1 to FIG. 4. Note that reference to front, rear, left, right, upward, and downward directions in the below explanation refers to front, rear, left, right, upward, and downward directions from the perspective of an occupant seated in a vehicle seat 10. In each of the drawings, the arrow FR indicates a seat forward direction, the arrow UP indicates a seat upward direction, the arrow RH indicates a seat right direction, and the arrow LH indicates a seat left direction as appropriate. The left-right direction corresponds to a seat width direction.

Figure 1:
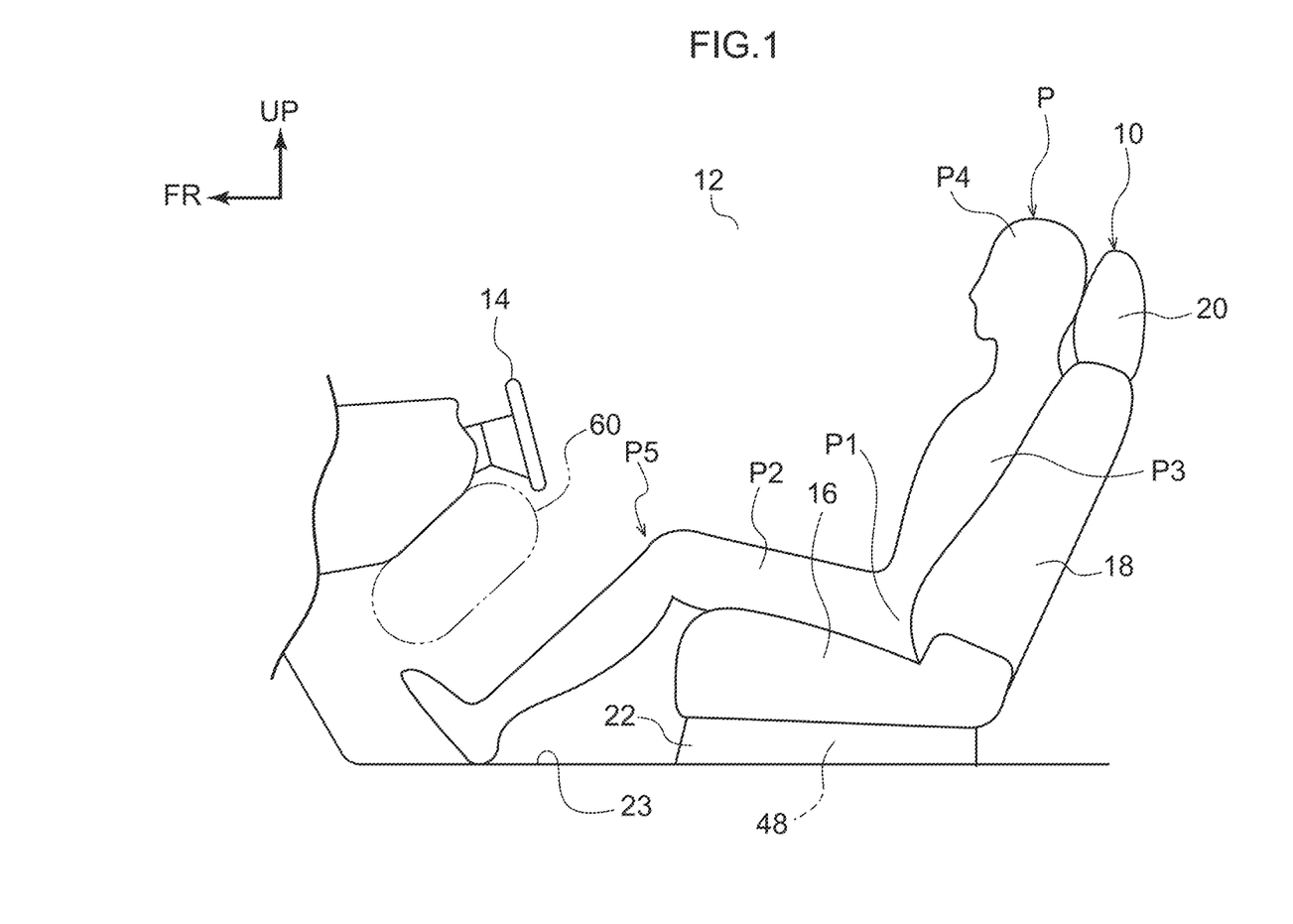
FIG. 1 is a side view illustrating a cabin applied with a vehicle seat structure of an exemplary embodiment.

FIG. 1 illustrates a cabin 12 applied with the vehicle seat structure of the present exemplary embodiment. As illustrated in FIG. 1, the cabin 12 is provided with the vehicle seat 10 for seating an occupant P who operates a steering wheel 14 and so on. The vehicle seat 10 includes a seat cushion 16 that supports the buttocks P1 and the thighs P2 of the occupant P, a seatback 18 that supports the back P3 of the occupant P, and a headrest 20 that supports the head P4 of the occupant P.

Note that the vehicle seat 10 of the present exemplary embodiment is provided in the cabin 12 of a self-driving vehicle. The vehicle seat 10 is thus configured capable of moving in the front-rear direction from a position where the occupant P seated in the vehicle seat 10 can operate the steering wheel 14 and so on to a position where the steering wheel 14 and so on cannot be operated. Note that FIG. 1 illustrates a state in which the occupant P seated on the vehicle seat 10 has moved the vehicle seat 10 rearward as far as the position where the steering wheel 14 and so on cannot be operated.

Figure 2:
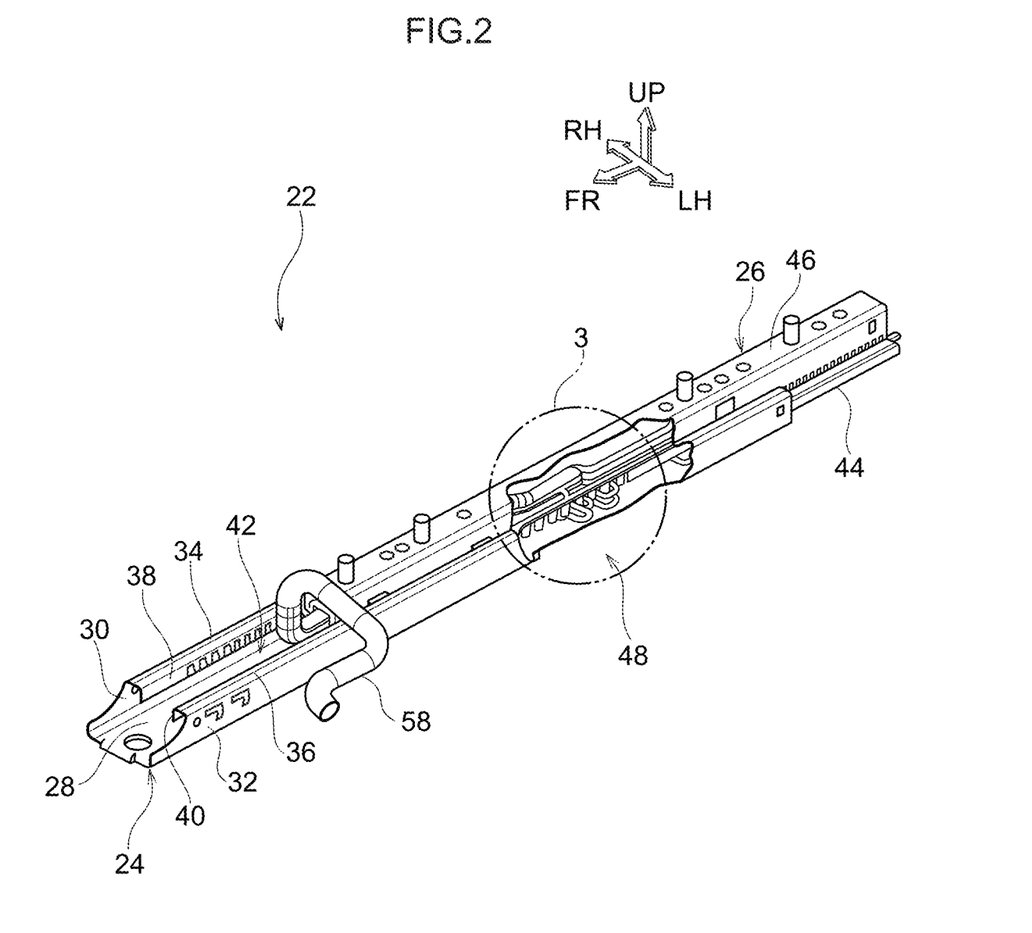
FIG. 2 is a perspective view illustrating a seat rail.

The vehicle seat 10 is fixed to a floor 23 of a vehicle body through seat rails 22. As illustrated in FIG. 2, each of the seat rails 22 includes a lower rail 24 serving as a fixed member fixed to the floor 23 of the vehicle body, and an upper rail 26 serving as a movable member that engages with the lower rail 24 so as to be capable of sliding along the lower rail 24.

Figure 3:
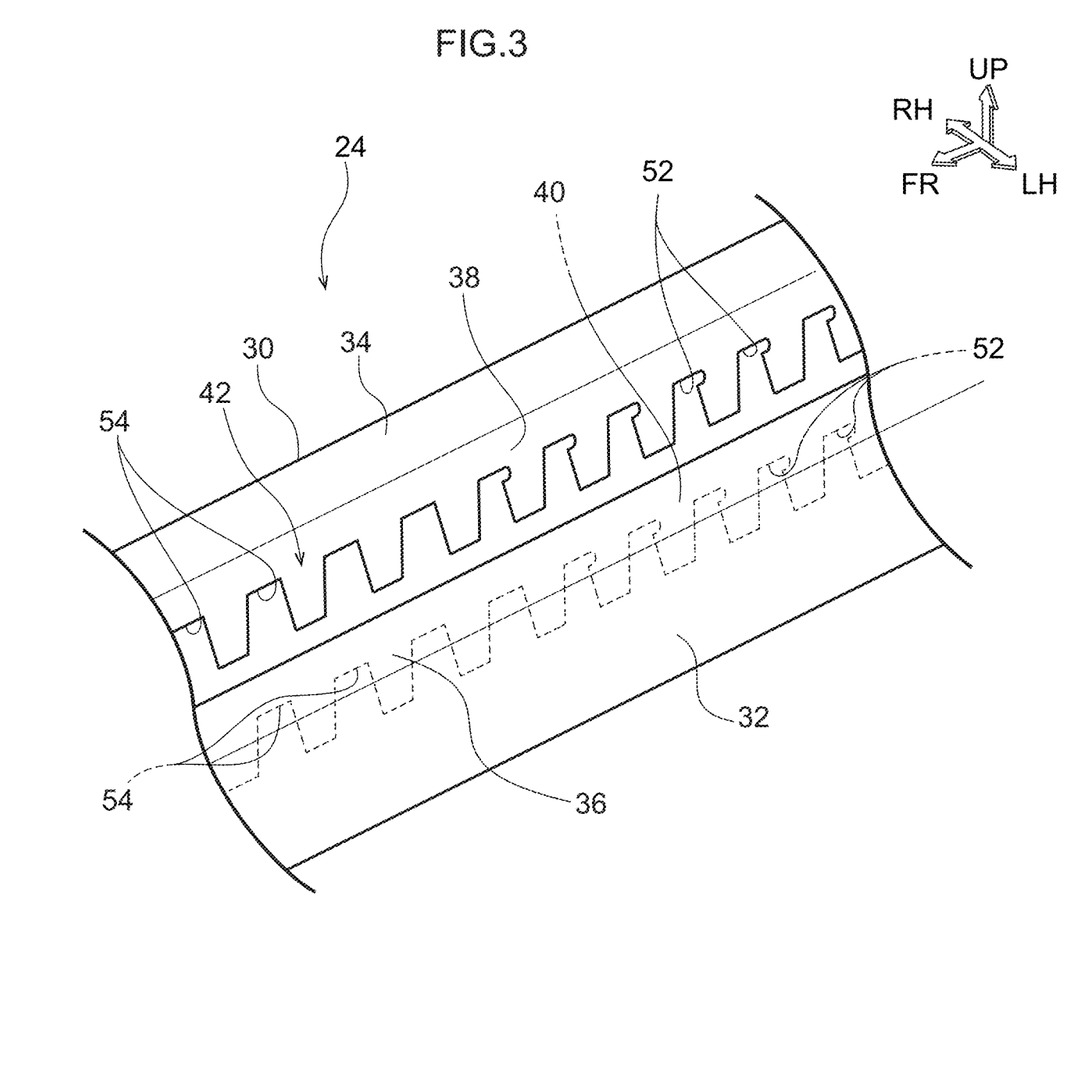
FIG. 3 is a perspective view illustrating a lower rail in the region encircled by line 3 in FIG. 2.

As illustrated in FIG. 2 and FIG. 3, the lower rail 24 is formed in an elongated shape with its length direction along the vehicle front-rear direction, and has a substantially U-shaped cross-section profile open toward the vehicle upper side as viewed from the vehicle front side. Specifically, the lower rail 24 includes a bottom wall 28 extending along the front-rear and left-right directions, and a right upright wall 30 and a left upright wall 32 respectively bent so as to extend upward from left and right direction end portions of the bottom wall 28. The lower rail 24 also includes a right upper wall 34 and a left upper wall 36 respectively bent so as to extend to the left or right from upper end portions of the right upright wall 30 and the left upright wall 32. The lower rail 24 also includes a right inner wall 38 and a left inner wall 40 respectively bent so as to extend downward from a left side end portion of the right upper wall 34 and a right side end portion of the left upper wall 36. An opening 42 is formed between the right inner wall 38 and the left inner wall 40.

As illustrated in FIG. 2, the upper rail 26 includes an upper rail main body 44 disposed in an inner portion of the lower rail 24. The upper rail 26 also includes a seat-fixed portion 46 projecting upward from the upper rail main body 44 through the opening 42 in the lower rail 24. A non-illustrated seat cushion frame configuring a framework of the seat cushion 16 (see FIG. 1) is fixed to an upper end portion of the seat-fixed portion 46.

Figure 4:
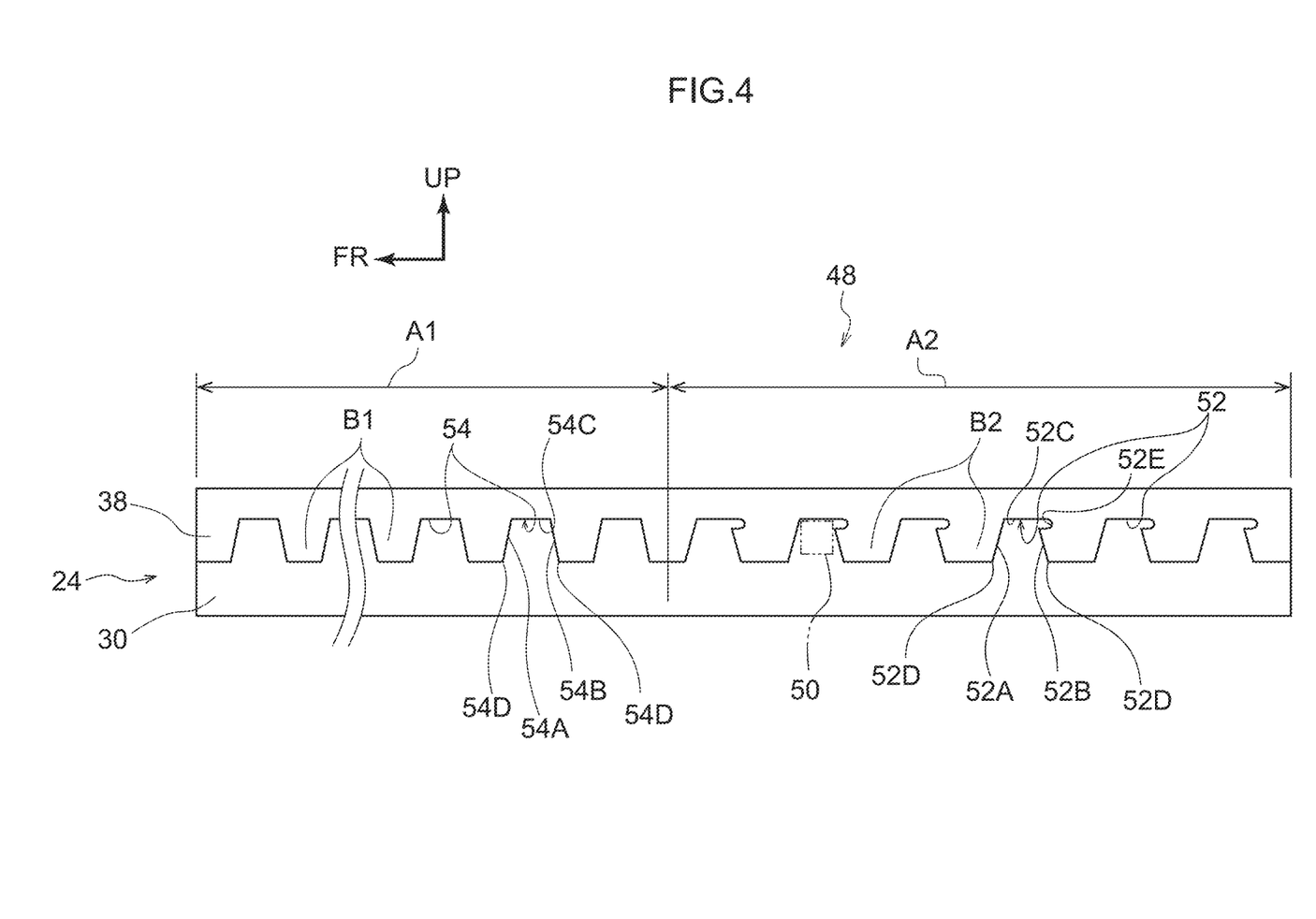
FIG. 4 is a side view illustrating recesses formed in a lower rail.

A lock mechanism 48 that restricts the upper rail 26 from moving (sliding) with respect to the lower rail 24 is provided to the seat rail 22. As illustrated in FIG. 4, the lock mechanism 48 (see FIG. 2) includes plural recesses 52, 54 serving as engagement portions formed to the right inner wall 38 and the left inner wall 40 of the lower rail 24, and an engaging portion 50 provided to the upper rail 26 (see FIG. 2). Note that FIG. 4 only illustrates the right inner wall 38, and illustration of the left inner wall 40 is omitted.

The plural recesses 52 are open downward, and are formed toward the seat rear sides of the right inner wall 38 and the left inner wall 40 of the lower rail 24. The plural recesses 52 are arrayed at uniform intervals along the front-rear direction. The plural recesses 54 are open downward, and are formed further toward the front side than the respective portions of the right inner wall 38 and the left inner wall 40 formed with the plural recesses 52. The plural recesses 54 are arrayed at uniform intervals along the front-rear direction.

Front edges 54A of the plural recesses 54 slope forward on progression downward, and rear edges 54B of the plural recesses 54 slope rearward on progression downward. Thus, a shape formed by linking together the front edge 54A, the rear edge 54B, a bottom 54C, and open ends 54D of each of the plural recesses 54 is an isosceles trapezoid shape.

The plural recesses 52 are similar to the recesses 54 in that front edges 52A of the plural recesses 52 slope forward on progression downward, and rear edges 52B of the plural recesses 52 slope rearward on progression downward. Thus, a shape formed by linking together the front edge 52A, the rear edge 52B, a bottom 52C, and open ends 52D of each of the plural recesses 52 is an isosceles trapezoid shape.

A notch 52E opening toward the front side is formed at a boundary between the rear edge 52B and the bottom 52C of each of the plural recesses 52. Thus, when placement of the engaging portion 50 corresponds to the recesses 52 and the engaging portion 50 presses a peripheral edge portion B2 of the recess 52 toward the front side, a peripheral edge portion of the recess 52 undergoes deformation originating at the bottom of the corresponding notch 52E. The strength of the peripheral edge portions B2 of the plural recesses 52 is thus lower than the strength of peripheral edge portions B1 of the plural recesses 54 that are disposed further toward the seat front side than the plural recesses 52 by an amount proportionate to the missing material at the notches 52E.

In the present exemplary embodiment, as an example, when rapid deceleration equivalent to an acceleration of 20G in the vehicle seat 10 (see FIG. 1) occurs in a state in which placement of the engaging portion 50 corresponds to the recesses 52, the peripheral edge portions B2 of the corresponding recesses 52 undergo plastic deformation originating at the bottoms of the notches 52E so as to close off open ends of the notches 52E. The strength of the peripheral edge portions B1 of the recesses 54 is set such that the peripheral edge portions B1 of the recesses 54 do not deform even when rapid deceleration equivalent to an acceleration of 20G in the vehicle seat 10 (see FIG. 1) occurs in a state in which placement of the engaging portion 50 corresponds to the recesses 54.

The engaging portion 50 is capable of being displaced by operation of a lever 58 (see FIG. 2) by the occupant P. The engaging portion 50 is selectively engaged with any recesses 52, 54 out of the plural recesses 52, 54 so as to restrict movement (sliding) of the upper rail 26 with respect to the lower rail 24. In a state in which the lever 58 has been operated and the engaging portion 50 has come out of the recesses 52, 54, movement (sliding) of the upper rail 26 with respect to the lower rail 24 is permitted.

Note that in a state in which the engaging portion 50 is disposed in a region A1 corresponding to the plural recesses 54, the front-rear position of the vehicle seat 10 is located at a position where the occupant P seated in the vehicle seat 10 is capable of operating the steering wheel 14 and so on (located within a range adjustable to the build of the occupant P). In a state in which the engaging portion 50 is disposed in a region A2 corresponding to the plural recesses 52, the front-rear position of the vehicle seat 10 is located at a position where the occupant P seated in the vehicle seat 10 is able to sit without operating the steering wheel 14 and so on.

Operation and Advantageous Effects of Present Exemplary Embodiment

Explanation follows regarding operation and advantageous effects of the present exemplary embodiment.

As illustrated in FIG. 1, FIG. 2, and FIG. 4, in a state in which the lever 58 has been operated and the engaging portion 50 is not disposed in any of the recesses 52, 54, movement of the upper rail 26 in the seat front-rear direction with respect to the lower rail 24 is permitted. When the engaging portion 50 engages with any of the recesses 52, 54, movement of the upper rail 26 in the seat front-rear direction with respect to the lower rail 24 is restricted, thereby fixing the position of the vehicle seat 10 (seat position) in the seat front-rear direction at a position corresponding to the recesses 52 or 54 with which the engaging portion 50 is engaged.

Figure 5:
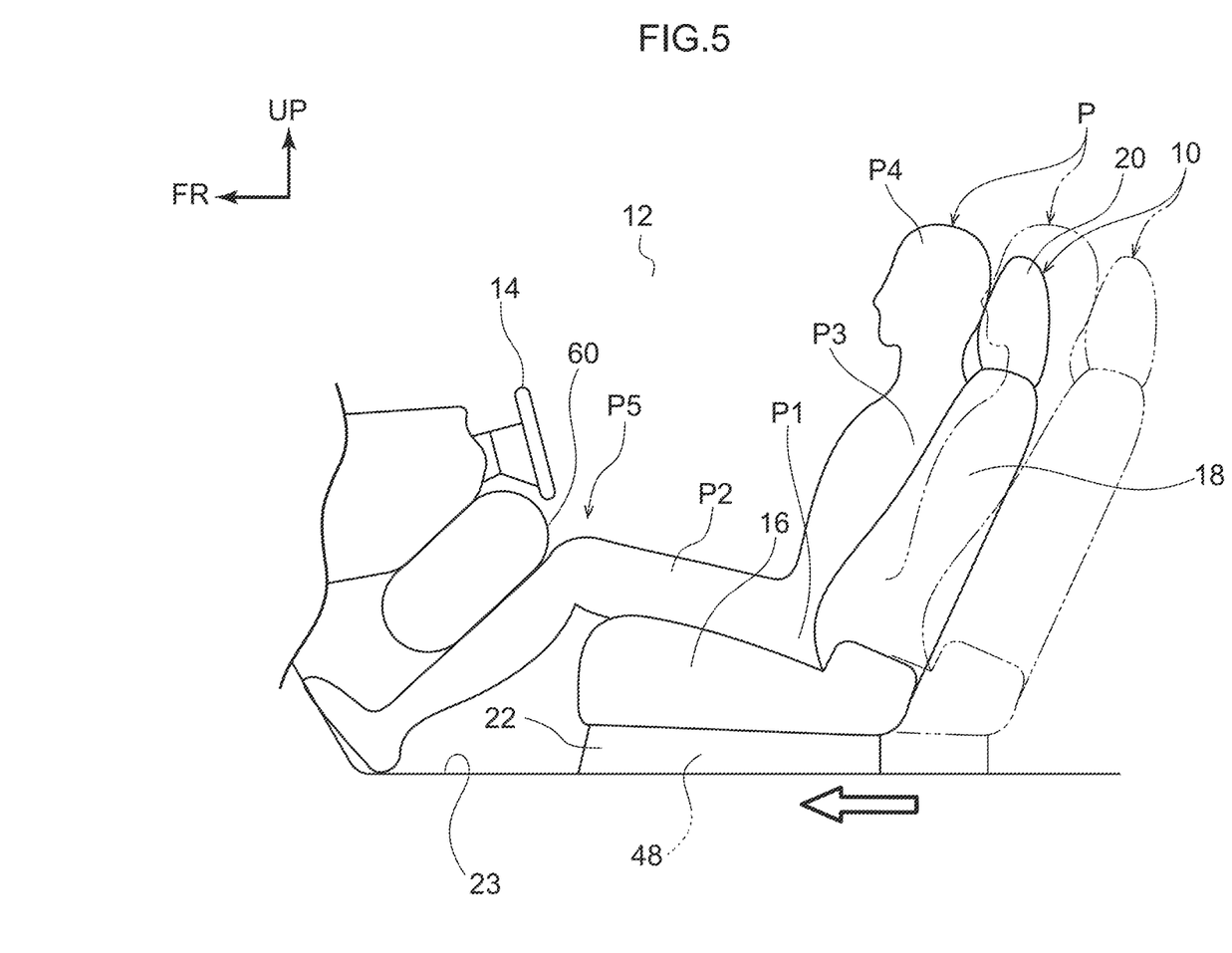
FIG. 5 is a side view corresponding to FIG. 1, illustrating a cabin during a head-on collision.

Note that in the present exemplary embodiment, out of the plural recesses 52, 54, the strength of the peripheral edge portions B2 of the plural recesses 52 disposed toward the seat rear side is lower than the strength of the peripheral edge portions B1 of the plural recesses 54 disposed further toward the seat front side than the plural recesses 52. Thus, when a force toward the seat front side arising due to inertia acts on the vehicle seat 10 in conjunction with a collision in a state in which the engaging portion 50 is engaged with any of the plural recesses 52 disposed toward the seat rear side, the engaging portion 50 presses the peripheral edge portions B2 of the corresponding recesses 52, and the peripheral edge portions B2 of the recesses 52 undergo plastic deformation originating at the bottoms of the notches 52E so as to close off the open ends of the notches 52E. The engaging portion 50 is thereby permitted to move toward the front side, such that movement of the upper rail 26 toward the seat front side with respect to the lower rail 24 is permitted, and the vehicle seat 10 moves toward the seat front side as illustrated in FIG. 5. This reduces the size of a space in which the legs P5 of the occupant P are able to move toward the seat front side. This enables the occupant P seated in the vehicle seat 10 to be suppressed from slipping toward the seat front side along the seat cushion 16 (i.e. the occurrence of the submarining phenomenon) in a vehicle collision.

Note that in the vehicle applied with the vehicle seat structure of the present exemplary embodiment, a knee airbag 60 is deployed during a collision as illustrated in FIG. 5. Thus, the movement of the vehicle seat 10 toward the seat front side during a collision enables the legs P5 of the occupant P to be brought closer to the knee airbag 60. This enables the legs P5 of the occupant P to be appropriately restrained by the knee airbag 60, enabling the submarining phenomenon to be effectively suppressed.

Moreover, in the present exemplary embodiment, the engaging portion 50 moves toward the front side while plastically deforming the peripheral edge portions B2 of the plural recesses 52 in sequence, thereby enabling kinetic energy of the vehicle seat 10 and the occupant P (kinetic energy in conjunction with a collision) to be absorbed.

Figure 6:
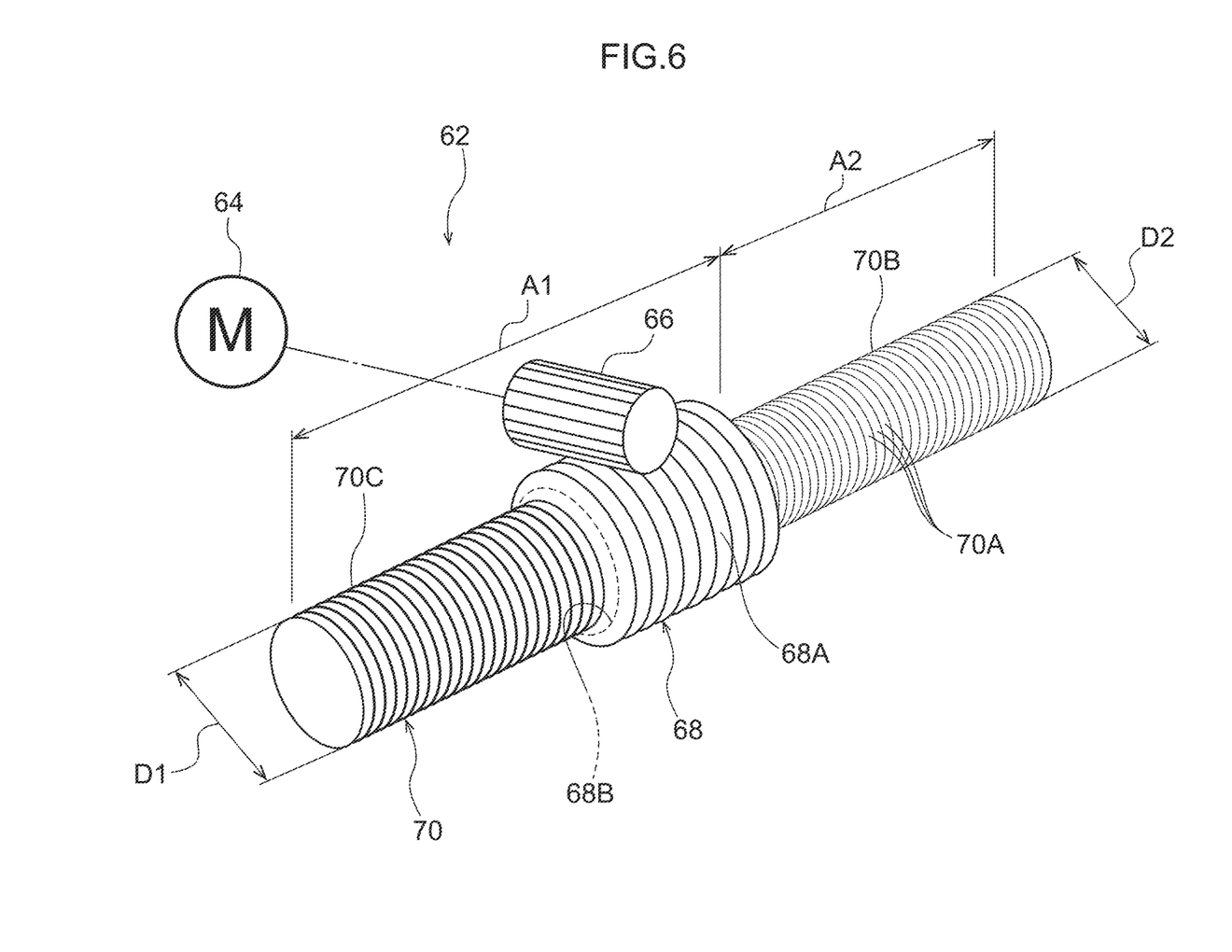
FIG. 6 is a perspective view schematically illustrating part of a power seat mechanism.

Note that although an example has been given in the present exemplary embodiment in which the submarining phenomenon is suppressed in a configuration in which the front-rear position of the vehicle seat 10 can be adjusted by the occupant P operating the lever 58, the present disclosure is not limited thereto. For example, as illustrated in FIG. 6, the configuration of the present disclosure that enables the submarining phenomenon to be suppressed may be applied to a configuration including a power seat mechanism 62 in which the front-rear position of the vehicle seat 10 is adjusted by the occupant P operating a switch.

To explain in detail, the power seat mechanism 62 includes a motor 64 fixed to the seat cushion frame or the like of the seat cushion 16 (see FIG. 1), a worm gear 66 that is rotated by the motor 64, a drive nut 68 serving as a first threaded member that is rotated by the worm gear 66, and a screw shaft 70 serving as a second threaded member engaged with the drive nut 68.

The drive nut 68 is formed in a tubular shape, inside which the screw shaft 70 is inserted. Outer teeth 68A that interlock with the worm gear 66 are formed to an outer peripheral portion of the drive nut 68. An inner tooth 68B serving as a first screw thread is formed to an inner peripheral portion of the drive nut 68.

The screw shaft 70 is formed in a solid rod shape. An outer tooth 70A serving as a second screw thread that interlocks with the inner tooth 68B of the drive nut 68 is formed along the length direction at an outer peripheral portion of the screw shaft 70. Note that the height of the outer tooth 70A at a seat rear side portion 70B of the screw shaft 70 is lower than the height of the outer tooth 70A at a seat front side 70C relative to the portion 70B. Thus, an outer diameter D2 of the seat rear side portion 70B of the screw shaft 70 is smaller than an outer diameter D1 of the seat front side 70C relative to the portion 70B.

In a configuration including the power seat mechanism 62 described above, when the drive nut 68 is rotated through the motor 64 and the worm gear 66, the drive nut 68 moves in the seat front-rear direction along the screw shaft 70. The upper rail 26 thereby moves in the seat front-rear direction with respect to the lower rail 24 (see FIG. 2), and the front-rear position of the vehicle seat 10 is adjusted.

In a state in which rotation of the motor 64 has stopped and rotation of the drive nut 68 has also stopped, movement of the drive nut 68 with respect to the screw shaft 70 is restricted. Movement of the upper rail 26 (see FIG. 2) with respect to the lower rail 24 is thereby restricted, and the front-rear position of the vehicle seat 10 is fixed. Note that the power seat mechanism 62 configures part of the lock mechanism 48 (see FIG. 4) previously described. Sections and so on of the power seat mechanism 62 corresponding to those of the lock mechanism 48 previously described are allocated with the same reference numerals as the corresponding sections and so on of the lock mechanism 48.

Note that in the configuration including the power seat mechanism 62, the height of the outer tooth 70A at the seat rear side portion 70B of the screw shaft 70 is lower than the height of the outer tooth 70A at the seat front side 70C relative to the portion 70B. Thus, when a force toward the seat front side arising due to inertia acts on the vehicle seat 10 in conjunction with a collision in a state in which the drive nut 68 is interlocked with the outer tooth 70A at the seat rear side portion 70B of the screw shaft 70, the drive nut 68 causes the outer tooth 70A at the seat rear side portion 70B of the screw shaft 70 to deform. Movement of the drive nut 68 toward the front side is thereby permitted, thereby permitting movement of the upper rail 26 toward the seat front side with respect to the lower rail 24, and the vehicle seat 10 moves toward the seat front side. This enables the occurrence of the submarining phenomenon to be suppressed.

An exemplary embodiment of the present disclosure has been explained above. However, the present disclosure is not limited to the above description, and obviously various other modifications may be implemented within a range not departing from the spirit of the present disclosure.

The entire content of the disclosure of Japanese Patent Application No. 2018-181196 filed on Sep. 27, 2018 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A vehicle seat structure, comprising:
 a vehicle seat including a seat cushion configured to support buttocks and thighs of an occupant;
 a movable member that is fixed to the vehicle seat and that moves in a seat front-rear direction together with the vehicle seat;
 a fixed member that is fixed to a floor of a vehicle body and that engages with the movable member and supports the movable member so as to allow movement of the movable member in the seat front-rear direction; and
 a lock mechanism configured to restrict movement of the movable member with respect to the fixed member, and also configured so as to permit movement of the movable member toward a seat front side with respect to the fixed member by at least part of the lock mechanism deforming when a force toward the seat front side, arising due to inertia, acts on the vehicle seat in conjunction with a collision in a state in which the movable member is engaged with a seat rear side portion of the fixed member;
 the lock mechanism including a plurality of engagement portions provided at the fixed member so as to be disposed at intervals along the seat front-rear direction, and including an engaging portion provided at the movable member and configured to engage with respective engagement portions;
 movement of the movable member in the seat front-rear direction with respect to the fixed member being permitted in a state in which the engaging portion is not engaged with the engagement portions;
 movement of the movable member in the seat front-rear direction with respect to the fixed member being restricted in a state in which the engaging portion is engaged with the engagement portions; and
 a strength of peripheral edge portions of a plurality of the engagement portions disposed toward the seat rear side being lower than a strength of peripheral edge portions of a plurality of the engagement portions disposed further toward the seat front side than the plurality of seat rear side engagement portions.

2. The vehicle seat structure of claim 1, wherein:
 the fixed member is a lower rail that is formed in an elongated shape with a length direction along a vehicle front-rear direction and that has a cross-section profile open toward a vehicle upper side as viewed from a vehicle front side, the lower rail including:
  a bottom wall extending along front-rear and left-right directions,
  a right upright wall and a left upright wall that are respectively bent so as to extend upward from left and right direction end portions of the bottom wall,
  a right upper wall and a left upper wall that are respectively bent so as to extend to the left or right from upper end portions of the right upright wall and the left upright wall, and
  a right inner wall and a left inner wall that are respectively bent so as to extend downward from a left side end portion of the right upper wall and a right side end portion of the left upper wall;
 the fixed member is formed with a plurality of downward-opening recesses in the right inner wall and the left inner wall, with front edges of each of the plurality of recesses sloping forward on progression downward and rear edges of each of the plurality of recesses sloping rearward on progression downward, such that a shape formed by linking together the front edge, the rear edge, a bottom, and an open end, of each of the recesses is an isosceles trapezoid shape;
 of the plurality of recesses, a forward-opening notch is formed at a boundary between the rear edge and the bottom of each recess configuring a plurality of the recesses at a seat rear side portion;
 the movable member provided with the engaging portion is configured by an upper rail disposed in an inner portion of the lower rail; and
 a strength of peripheral edge portions of the plurality of the recesses disposed at the seat rear side is lower than a strength of peripheral edge portions of a plurality of the recesses disposed further toward the seat front side than the plurality of seat rear side recesses, due to the engaging portion engaging with one of the recesses and a peripheral edge portion of the recess being deformable about the bottom of the notch when the engaging portion engaged with the recess presses the peripheral edge portion of the recess forward.

3. A vehicle seat structure, comprising:
 a vehicle seat including a seat cushion configured to support buttocks and thighs of an occupant;
 a movable member that is fixed to the vehicle seat and that moves in a seat front-rear direction together with the vehicle seat;
 a fixed member that is fixed to a floor of a vehicle body and that engages with the movable member and supports the movable member so as to allow movement of the movable member in the seat front-rear direction; and
 a lock mechanism configured to restrict movement of the movable member with respect to the fixed member, and also configured so as to permit movement of the movable member toward a seat front side with respect to the fixed member by at least part of the lock mechanism deforming when a force toward the seat front side, arising due to inertia, acts on the vehicle seat in conjunction with a collision in a state in which the movable member is engaged with a seat rear side portion of the fixed member, the lock mechanism including a first threaded member that includes a first screw thread and is moved in the seat front-rear direction together with the movable member, and a second threaded member including a second screw thread interlocking with the first screw thread, the first threaded member being moved in the seat front-rear direction along the second threaded member and the movable member being moved in the seat front-rear direction with respect to the fixed member by rotation of the first threaded member, movement of the first threaded member with respect to the second threaded member being restricted and movement of the movable member in the seat front-rear direction with respect to the fixed member being restricted in a state in which rotation of the first threaded member has stopped, and a height of the second screw thread at a seat rear side portion being lower than a height of the second screw thread further toward the seat front side than the seat rear side portion of the second screw thread.

4. The vehicle seat structure of claim 3, wherein:

the lock mechanism comprises a power seat mechanism having a motor as a drive source, the power seat mechanism includes:
- a worm gear configured to be rotated by the motor,
- a drive nut serving as the first threaded member and rotated by the worm gear, and including an inner peripheral portion formed with an inner tooth serving as the first screw thread, and
- a screw shaft serving as the second threaded member and including an outer peripheral portion formed with an outer tooth serving as the second screw thread that interlocks with the inner tooth, and a height of the outer tooth at a seat rear side portion is lower than a height of the outer tooth further toward the seat front side than the seat rear side portion so as to enable deformation of the outer tooth at the seat rear side portion by the drive nut and thereby permit movement of the movable member toward the seat front side with respect to the fixed member when the force toward the seat front side, arising due to inertia, acts on the vehicle seat in conjunction with a collision in a state in which the inner tooth and the outer tooth are interlocked with each other.

* * * * *